US010227868B2

United States Patent
DePavia et al.

(10) Patent No.: US 10,227,868 B2
(45) Date of Patent: Mar. 12, 2019

(54) ELECTROMAGNETIC TELEMETRY USING CAPACITIVE SURFACE ELECTRODES

(71) Applicant: Schlumberger Technology Corporation, Sugar Land, TX (US)

(72) Inventors: Luis E. DePavia, Sugar Land, TX (US); Jiuping Chen, San Pablo, CA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 67 days.

(21) Appl. No.: 15/341,835

(22) Filed: Nov. 2, 2016

(65) Prior Publication Data
US 2017/0227667 A1 Aug. 10, 2017

Related U.S. Application Data

(60) Provisional application No. 62/249,618, filed on Nov. 2, 2015.

(51) Int. Cl.
*G01V 3/00* (2006.01)
*E21B 47/12* (2012.01)
(Continued)

(52) U.S. Cl.
CPC .............. *E21B 47/122* (2013.01); *G01V 3/08* (2013.01); *G01V 3/081* (2013.01); *G01V 3/083* (2013.01);
(Continued)

(58) Field of Classification Search
CPC ... G01V 3/18; G01V 3/26; G01V 3/28; G01V 2003/084; G01V 3/08; G01V 3/081; G01V 3/083; G01V 3/10
(Continued)

(56) References Cited

U.S. PATENT DOCUMENTS 6,686,800 B2 2/2004 Krupka
6,961,601 B2 11/2005 Matthews et al.
(Continued)

FOREIGN PATENT DOCUMENTS

WO WO2016196246 A1 12/2016
WO WO2017/024083 † 2/2017

OTHER PUBLICATIONS

Bhagwan et al., Electric Drill Stem telemetry. IEEE Transactions on Geoscience and Remote Sensing. GE-20, No. 2, pp. 193-197.
(Continued)

*Primary Examiner* — Huy Q Phan
*Assistant Examiner* — Raul Rios Russo

(57) ABSTRACT

A method for signal communication between a well drilling instrument and the Earth's surface includes generating an electromagnetic field in an instrument disposed in drill string used to drill a wellbore. The electromagnetic field comprises encoded measurements from at least one sensor associated with the instrument. A signal is measured corresponding to an amplitude, phase or frequency of the electromagnetic field. The measurements are decoded from the measured signal. The measured signal comprises at least one of a voltage imparted across a capacitive electrode proximate ground surface and a galvanic electrode in contact with the ground surface, and a voltage imparted across two capacitive electrodes each proximate a ground surface and separated from each other by a known distance.

16 Claims, 7 Drawing Sheets

(51) Int. Cl.
    *G01V 3/28*     (2006.01)
    *G01V 3/26*     (2006.01)
    *G01V 3/18*     (2006.01)
    *G01V 3/08*     (2006.01)
    *G01V 3/10*     (2006.01)

(52) U.S. Cl.
CPC ............... *G01V 3/18* (2013.01); *G01V 3/26* (2013.01); *G01V 3/28* (2013.01); *G01V 3/10* (2013.01); *G01V 2003/084* (2013.01)

(58) Field of Classification Search
USPC ....... 324/323, 327, 329, 330, 332–334, 338, 324/346, 351
See application file for complete search history.

(56) References Cited

U.S. PATENT DOCUMENTS

| | | | |
|---|---|---|---|
| 7,145,473 | B2 | 12/2006 | Wisler et al. |
| 7,880,640 | B2 † | 2/2011 | Lovell |
| 8,238,197 | B2 | 8/2012 | Crice et al. |
| 2006/0028208 | A1* | 2/2006 | Strack ............ G01V 3/24 324/355 |
| 2007/0255499 | A1* | 11/2007 | Strack ............ G01V 11/00 702/11 |
| 2007/0294036 | A1* | 12/2007 | Strack ............ G01V 3/083 702/14 |
| 2013/0066561 | A1* | 3/2013 | Thompson ........ G01V 11/007 702/13 |
| 2013/0300419 | A1 | 11/2013 | Hibbs |
| 2014/0039796 | A1* | 2/2014 | Thompson ........ G01V 11/007 702/11 |
| 2015/0061683 | A1 | 3/2015 | Marsala et al. |
| 2015/0061684 | A1 | 3/2015 | Marsala et al. |
| 2015/0160364 | A1 † | 6/2015 | Hibbs |
| 2015/0219784 | A1 | 8/2015 | Hibbs et al. |
| 2017/0362932 | A1* | 12/2017 | Gao ................ E21B 47/122 |

OTHER PUBLICATIONS

Chi et al., Wireless non-contact EEG/ECG electrodes for body sensor networks. Body Sensor Networks International Conference. 2010.

Degauque et al., Propagation of electromagnetic waves along a drillstring of finite conductivity. SPE 12943. SPE Drilling Engineering. Jun. 1987. pp. 127-134.

Hibbs et al., New electromagnetic sensors for magnetotelluric and induced polarization surveys. Society of Exploration Geophysicists (SEG) Annual Meeting. Las Vegas, Nevada. 2012.

Lopez et al., Capacitive electrocardiographic and bioelectric electrodes. IEEE Transactions on Biomedical Engineering. 16:299-300. 1969.

\* cited by examiner
† cited by third party

ELECTROMAGNETIC TELEMETRY USING CAPACITIVE SURFACE ELECTRODES

CROSS-REFERENCE TO RELATED APPLICATIONS

This application claims the benefit of U.S. Provisional Application No. 62/249,618, filed Nov. 2, 2015.

BACKGROUND

This disclosure is related to the field of measurement while drilling ("MWD") and logging while drilling ("LWD"). More particularly, the disclosure relates to improved electromagnetic telemetry techniques for communicating data between MWD and/or LWD instruments and the Earth's surface.

U.S. Patent Application Publication No. 2011/0168446A1 and U.S. Pat. No. 7,145,473 B2 describe examples of electromagnetic telemetry for communicating signals between equipment disposed at the Earth's surface and LWD and/or MWD instruments disposed in a wellbore. One type of electromagnetic telemetry known in the art includes an electric dipole antenna formed by an insulated gap between conductive segments on a drill collar associated with the MWD and/or LWD instruments, or by a toroidal wire coil disposed on the outer surface of the collar. A time varying voltage impressed across the insulated gap (or the toroid) generates an electromagnetic field which can be used to communicate between a surface electric dipole receiver antenna or a plurality of differently oriented electric dipole antennas and the MWD/LWD instrument. See the basic concept shown in FIG. 1. A surface transceiving sensor, i.e., a dipole antenna, may be composed of an electrode placed in the ground at a selected distance from a drilling unit or "rig" and the well casing. The voltage between the electrode and the well casing is measured and signals from the MWD and/or LWD instruments encoded into the transmitted electromagnetic field are decoded from the measured voltages. Conversely, electric current injected across the casing and electrode may induce an electromagnetic field in the subsurface that is detectable by the dipole antenna or toroid on the MWD/LWD instrument and internally decoded. The foregoing signal communication from wellbore to surface may be referred to as "uplink" communication and the surface to wellbore communication may be referred to as "downlink" communication.

SUMMARY

One aspect of the disclosure relates to a method for signal communication between a well drilling instrument and the Earth's surface. A method according to this aspect includes generating an electromagnetic field in an instrument disposed in drill string used to drill a wellbore. The electromagnetic field comprises encoded measurements from at least one sensor associated with the instrument. A signal is measured corresponding to an amplitude, phase, and/or frequency of the electromagnetic field. The measurements are decoded from the measured signal. The measured signal comprises at least one of a voltage imparted across a capacitive electrode proximate to ground surface and a galvanic electrode in contact with the ground surface, and a voltage imparted across two capacitive electrodes each proximate a ground surface and separated from each other by a known distance.

Other aspects and possible advantages of systems and methods according to the present disclosure will be apparent from the description and claims that follow.

DETAILED DESCRIPTION

Figure 1:
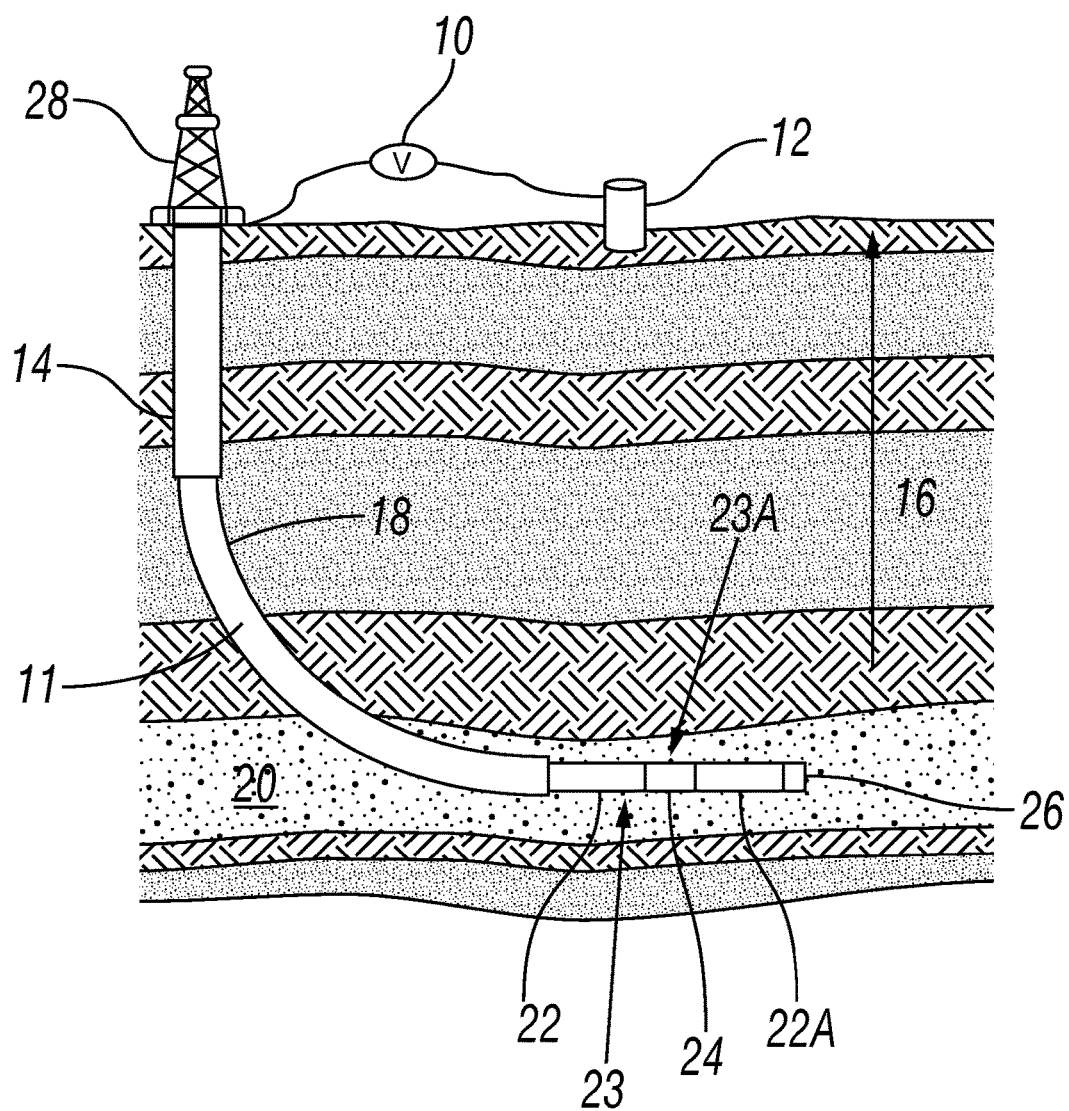
FIG. 1 shows an electromagnetic telemetry system known in the art prior to the present disclosure.

With reference to FIG. 1, an electromagnetic telemetry system known in the art is shown to explain the basic components thereof. U.S. Patent Application Publication No. 2011/0168446A1 and U.S. Pat. No. 7,145,473B2 referred to above describe adaptations of the system shown in FIG. 1 and may be referred to for more details. A drilling unit or "rig" is shown generally at 28 and has equipment (not shown separately) to raise, lower and rotate a drill string 18 with a bottom hole assembly (BHA) 23 at its lower end. A drill bit 26 is disposed at the longitudinal end of the BHA 23 and is rotated, either by the drilling unit 28 and/or a motor (not shown) in the drill string 18 to axially extend the length of a wellbore 11. When the wellbore 11 is initially drilled to a selected depth, a casing 14 may be inserted into the wellbore 11 and cemented in place. Drilling may then resume. The BHA 23 may include an MWD and/or LWD instrument, shown generally at 23A. The MWD/LWD instrument may be any type known in the art and may include sensors (not show separately) for measuring orientation of the BHA 23, as well as sensors for measuring shock and vibration of the BHA 23, and/or sensors for measuring one or more physical parameters of the formations (including conductive layers 16 and a reservoir formation 20) through which the instrument 23A passes during drilling and any subsequent movement within or along the wellbore 11. Such physical parameters may be of any kind known in the art, and may include, without limitation, electrical resistivity, acoustic velocity, natural gamma radiation, spectrally analyzed natural gamma radiation, density, neutron porosity and/or capture cross section, and nuclear magnetic resonance relaxation times. The foregoing are only examples and in no way are intended to limit the scope of the present disclosure.

In the present example circuitry (not shown) in the instrument 23A may be used to impart a time varying voltage across an insulating gap 24 disposed between conductive components 22, 22A of the instrument 23A. The circuitry (not shown) in the instrument 23A may include devices to encode measurements from the various sensors (not shown) in the instrument into the time varying voltage. The imparted voltage generates a time varying electromagnetic field in the formations 20, 16 which includes the encoded measurement data. In the present example, a voltage induced between an electrode 12 inserted into the ground at a selected distance from the drilling rig 28 and the casing 14 may be measured and decoded into data encoded into the time varying voltage by a surface measurement and decoding system, shown generally at 10 and which may be of any type known in the art.

However, the amplitude of the electromagnetic field induced by the instrument 23A is highly attenuated before it reaches the surface. Research has found that limiting factors for the received signal amplitude include the subsurface formation resistivity distribution, drilling fluid electrical resistivity and the depth of the MWD/LWD instrument in the wellbore. All of the foregoing may cause substantial transmitted signal attenuation such that reliable data communication may be difficult to obtain. Electromagnetic telemetry is preferred over drilling fluid flow modulation ("mud pulse") telemetry not only because it works in certain conditions where mud pulse telemetry does not, e.g., underbalanced drilling or when the gas or air is used as the drilling fluid, but more importantly, higher data communication rate can be achieved if the signal attenuation can be adequately reduced.

Figure 2B:
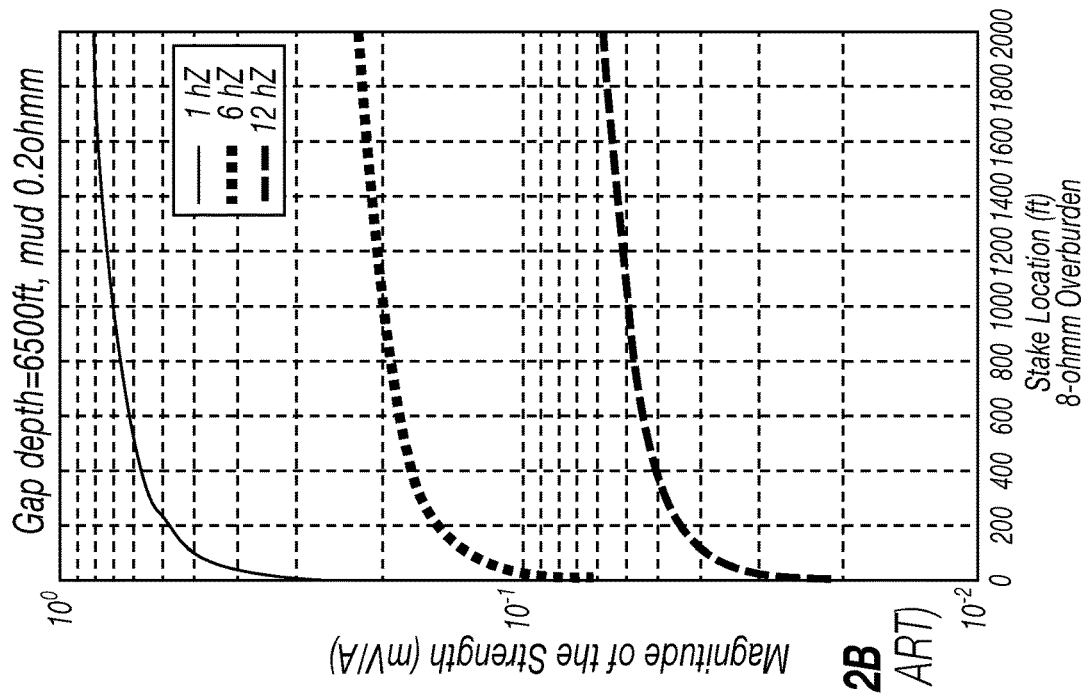
FIGS. 2A and 2B show, respectively, attenuation of transmitted telemetry signal at various frequencies by overburden formation at a telemetry transmitter depth of 6,500 feet for overburden resistivity of 2 ohm-m and 8 ohm-m using the telemetry as shown in FIG. 1.
Figure 2A:
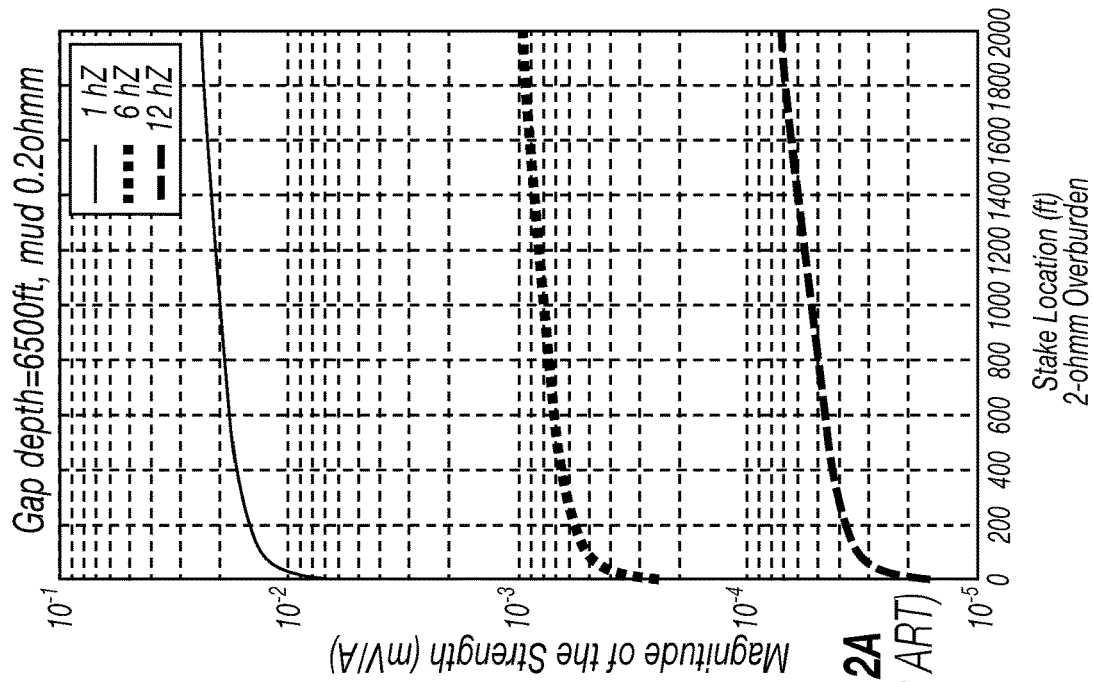

FIGS. 2A and 2B show examples of how conductive formations overlying the instrument (23A in FIG. 1), called "overburden", attenuate the amplitude of the voltage detectable at the surface. The attenuation is sensitive to the frequency of the time varying voltage imparted across the insulating gap (24 in FIG. 1) and thus, depending on certain conditions may limit the available rate at which data may be communicated between the surface and the instrument (23A in FIG. 1). Conductive drilling fluid in the wellbore and conductive formations are two of the most significant barriers to high data rate signal communication. FIG. 2A shows the case where the formations overlying the wellbore in which the MW/LWD tool have a resistivity of about 2 ohm-m, and FIG. 2B shows the case for overlying formations having resistivity of about 8 ohm-m.

The detected telemetry signal may be electric potential difference or voltage between two galvanic electrodes, which are usually separated by hundreds feet, proximate the surface. The electrodes make galvanic contact with the ground and therefore have to be inserted into or buried in the ground to ensure they are at the same potential of the earth at the location being measured. For convenience, galvanic electrodes may be simple steel stakes, which are about 8 feet long and having a diameter of about 1 inch. Two limitations in using galvanic electrodes include first that there are high resistance terrains, such as desert, frozen ground, gravel and caliche, for which voltage difference measurements are difficult to make. Second, it can be quite laborious to pound into the ground and remove these steel stakes. Further, if numerous steel stakes are required in a remote EM telemetry network, the labor is compounded accordingly. Burying electrodes is also time consuming when numerous locations around the drilling rig need to be evaluated to locate an electrode position for optimal electromagnetic signal reception.

Figure 3:
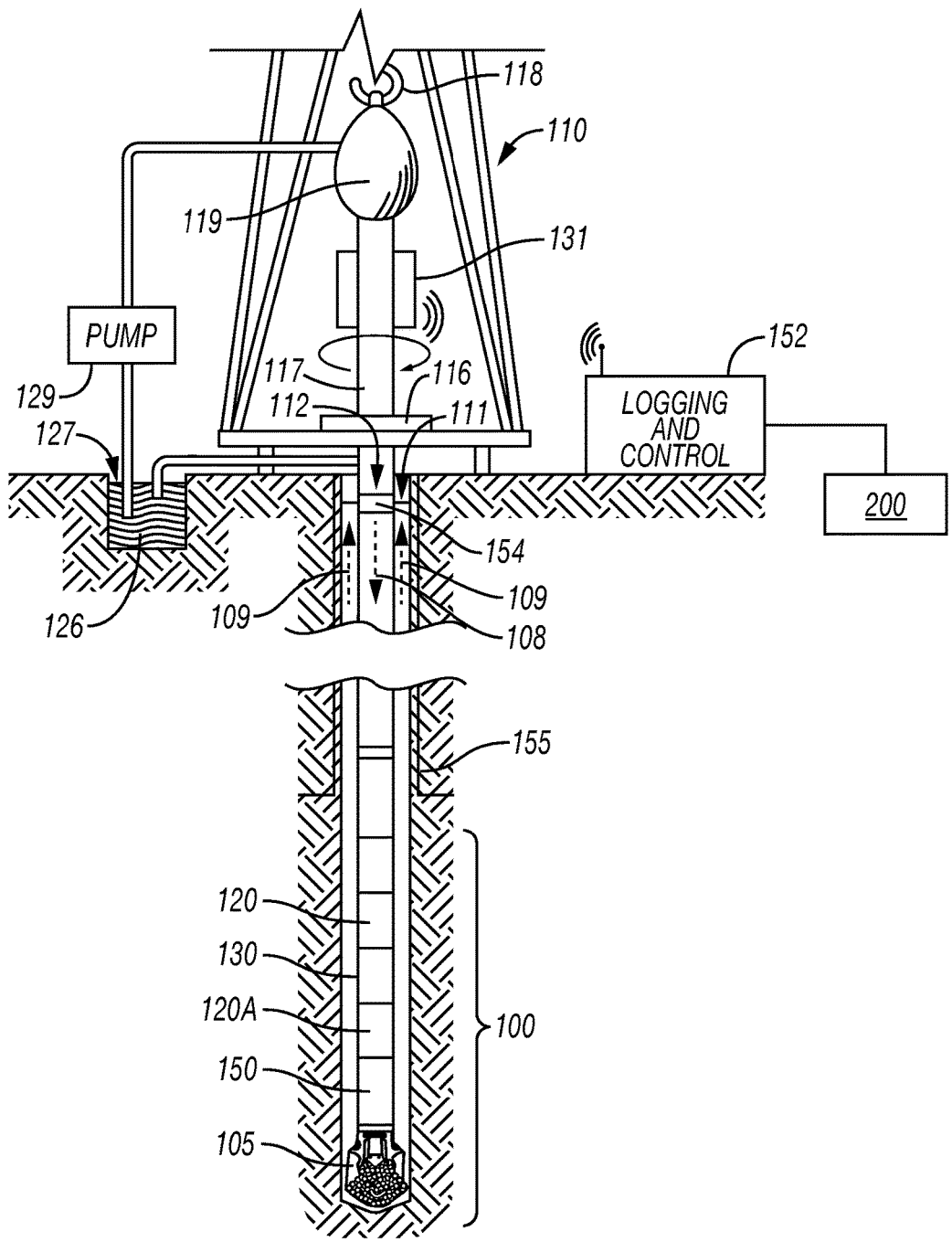
FIG. 3 shows one example of drilling, measurement and telemetry system of some embodiments.

FIG. 3 shows an example embodiment of a drilling and measurement system that may be used in various embodiments according to the present disclosure. The system shown in FIG. 3 may be deployed in either onshore or offshore applications. In a system as shown in FIG. 3, a wellbore 111 is formed in subsurface formations by rotary drilling in a manner that is well known to those skilled in the art. Although the wellbore 111 in FIG. 3 is shown as being drilled substantially straight and vertically, the wellbore 111 may be directionally drilled, including having a substantially horizontal section, with equal effect as a substantially vertical wellbore.

A drill string 112 is suspended within the wellbore 111 and may have a bottom hole assembly (BHA) 100 which includes a drill bit 105 at its lower end. The surface part of the system includes a platform and derrick assembly 110 positioned over the wellbore 111, with the platform and derrick assembly 110 including a rotary table 116, a kelly 117, a hook 118 and a rotary swivel 119. In a drilling operation, the drill string 112 may be rotated by the rotary table 116 (energized by means not shown), which engages the kelly 117 at the upper end of the drill string 112. The kelly 117 is suspended from the hook 118. The hook 118 may be attached to a traveling block (not shown), through the kelly 117 and the rotary swivel 119 which permits rotation of the kelly 117 and thereby the drill string 112 relative to the hook 118. As is well known, a top drive system could be used in other embodiments in substitution for the kelly 117, rotary table 116 and swivel 119.

Drilling fluid or mud 126 may be stored in a pit 127 formed at the well site (or on a drilling platform in marine drilling). A pump 129 moves the drilling mud 126 from the tank or pit 127 to the interior of the drill string 112 via a port in the swivel 119, which causes the drilling fluid 126 to flow downwardly through the drill string 112, as indicated by directional arrow 108. The drilling mud 126 exits the drill string 112 via ports (not shown) in the drill bit 105, and then circulates upwardly through an annular space region between the outside of the drill string 112 and the wall of the wellbore 111, as indicated by directional arrows 109. In this known manner, the drilling mud 126 lubricates and cools the drill bit 105 and carries formation cuttings up to the surface as it is returned (after removal of entrained drill cuttings and other contaminants) to the pit 127 for recirculation.

The BHA 100 is shown as having one MWD module 130 and one or more LWD modules 120 with reference number 120A depicting an electromagnetic signal transmitter. As used herein, the term "module" as applied to the MWD and LWD devices is understood to mean either a single measuring instrument or multiple measuring instruments contained in a single modular device, or multiple modular devices. Additionally, the BHA 100 may include a rotary steerable system (RSS) and motor 150 or a steerable drilling motor.

The LWD module(s) 120 may be housed in a drill collar and can include one or more types of well logging sensors. The LWD module(s) 120 may include capabilities for measuring, processing, and storing information, as well as for communicating with surface equipment. By way of example, the LWD module(s) 120 may include one or more of a nuclear magnetic resonance (NMR) logging tool, a nuclear logging tool, a resistivity logging tool, an acoustic logging tool, or a dielectric logging tool, and so forth, and may include capabilities for measuring, processing, and storing information, and for communicating with the surface equipment (e.g., by suitably operating the electromagnetic signal transmitter 120A).

The MWD module 130 may also be housed in a drill collar, and may contain one or more devices for measuring characteristics of the drill string 112 and drill bit 105. In the present embodiment, the MWD module 130 may include one or more of the following types of measuring devices: a weight-on-bit measuring device, a torque measuring device, a vibration measuring device, a shock measuring device, a stick/slip measuring device, a direction measuring device, and an inclination measuring device (the latter two sometimes being referred to collectively as a "D&I package"). The MWD module 130 may further include an apparatus (not shown) for generating electrical power for the MWD module 130 and the LWD module(s) 120. For example, electrical power generated in the MWD module 130 may be used to power the MWD module 130 and the LWD module(s) 120. In the present example embodiment, the electrical power may be generated by a mud flow driven turbine generator (not shown) or may be stored in batteries (not shown) and may be used to operate the measurement devices in the respective modules 120, 130 and the electromagnetic signal transmitter 120A. Any of the LWD module(s) 120 and the MWD module 130 may include circuitry to drive the electromagnetic signal transmitter 120A to generate an encoded electromagnetic signal that includes any or all of the various sensor measurements made by the devices in the respective modules 120, 130. The electromagnetic signal transmitter 120A may be, for example and without limitation an insulating gap disposed between electrodes, wherein a time varying voltage corresponding to the electromagnetic transmitter signal to be generated is imparted across the electrodes. In other embodiments, the electromagnetic transmitter 120A may be a toroidal wire coil through which a time varying electrical current is passed. The amplitude of the time varying current may correspond to the electromagnetic transmitter signal that is to be generated. Signals generated by the electromagnetic signal transmitter may be detected by one or more sensors 200 and such signals communicated to a recording and control unit 152 at the surface.

Figure 3A:
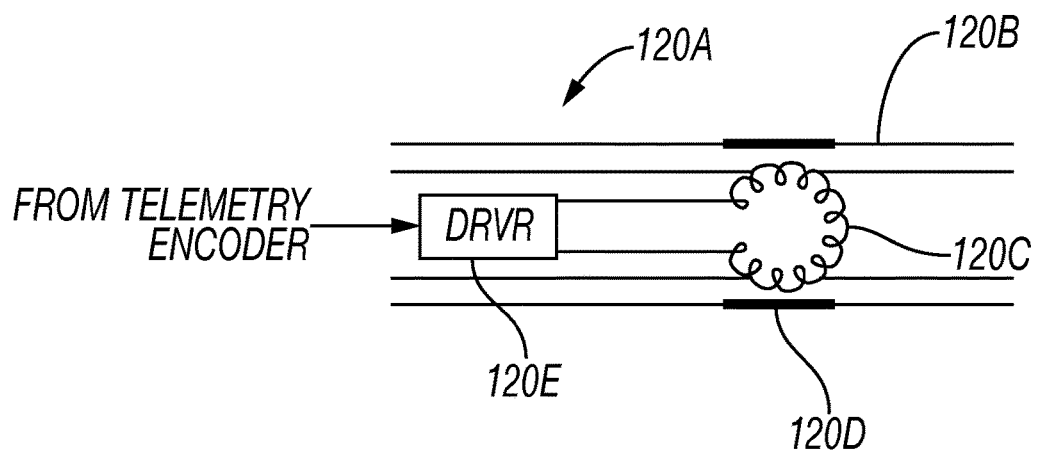
FIG. 3A shows one example embodiment of an electromagnetic signal transmitter.
Figure 3B:
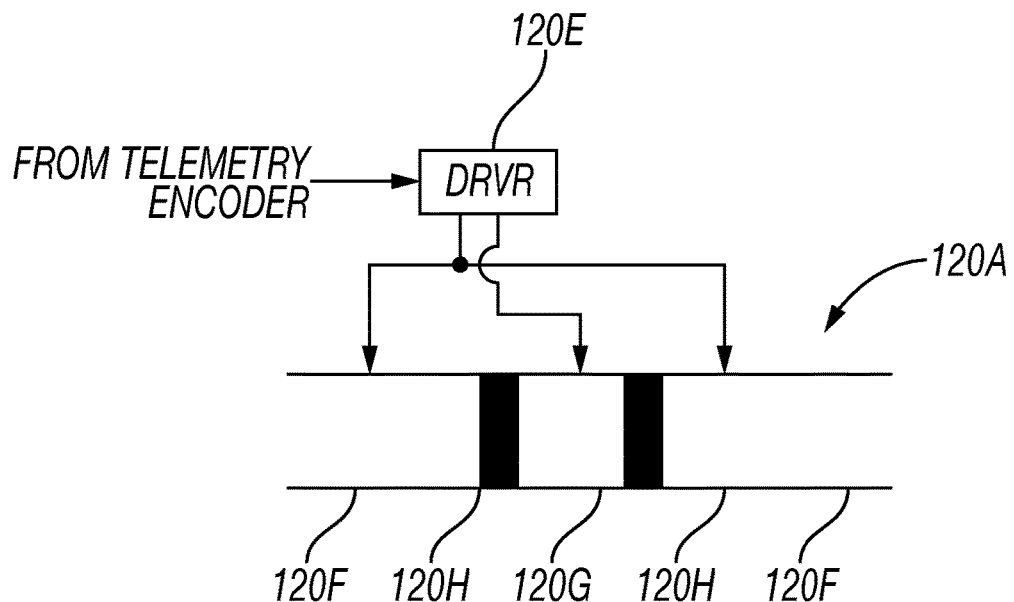
FIG. 3B shows another example embodiment of an electromagnetic signal transmitter.

The foregoing examples of an electromagnetic signal transmitter are shown in FIGS. 3A and 3B, respectively. In FIG. 3A, a transmitter driver 120E may be in signal communication at its input with a telemetry encoder (not shown separately) in either of the MWD module (130 in FIG. 3) or the LWD module (120 in FIG. 3). The transmitter driver 120E output may be coupled to a toroidal coil 120C disposed in a recess on the exterior of a drill collar 120B in which the functional components of the electromagnetic signal transmitter 120A may be disposed. The toroidal coil 120C may be covered on its exterior by a wear resistant shield 120D. FIG. 3B shows another example embodiment of the electromagnetic signal transmitter 120A, in which the transmitter driver 120E has its output electrically connected to first electrodes 120F electrically isolated by insulators 120H from a second electrode 120G. In the present example embodiment, a time varying voltage corresponding to the encoded electromagnetic telemetry signal may be imparted across the first 120F and second 120H electrodes. For both the foregoing embodiments, the time varying current or voltage induces an electromagnetic field in the formations surrounding the electromagnetic signal transmitter 120A, a component of which may be detected as will be further explained with reference to FIGS. 4 and 5.

Returning to FIG. 3, operation of the MWD 130 and LWD 120 modules may be controlled using the surface logging and control system 152 (control system) located at the surface, in some embodiments proximate the wellbore 111. The control system 152 may include one or more processor-based computing systems. In the present context, a processor or processor-based computing system may include a microprocessor, programmable logic devices (PLDs), field-gate programmable arrays (FPGAs), application-specific integrated circuits (ASICs), system-on-a-chip processors (SoCs), or any other suitable integrated circuit capable of executing encoded instructions stored, for example, on tangible computer-readable media (e.g., read-only memory, random access memory, a hard drive, optical disk, flash memory, etc.). Such instructions may correspond to, for instance, workflows and the like for carrying out a drilling operation, algorithms and routines for processing data received at the surface from the BHA 100 (e.g., as part of an inversion to obtain one or more desired formation parameters), and the like. The control system 152 may include circuitry, not shown separately, for detecting a voltage induced across one or more capacitance type electrodes 200 as will be further explained with reference to FIG. 4. In some embodiments, a current sensor or current clamp 131 may measure current induced in the drill string 112 by operation of the electromagnetic signal transmitter 120A. As explained above, an electromagnetic field is induced in the subsurface formations when the electromagnetic signal transmitter 120A is actuated, and such electromagnetic field induces voltages or current that may be measured as will be further explained herein. The measured voltage or current may have an amplitude and/or phase that is related to the electromagnetic field induced by the electromagnetic signal transmitter 120A.

The drill string 112 may include one or more standoffs or centralizers 154 disposed in or on the drill string 112 in a portion disposed in a casing 155 in the wellbore 111, in some embodiments disposed proximate the surface end of the casing 155. The standoffs or centralizers 154 may have an external diameter larger than an external diameter of the drill string 112 disposed in the casing 155, up to a limit of an internal diameter of the casing 155.

Figure 4:
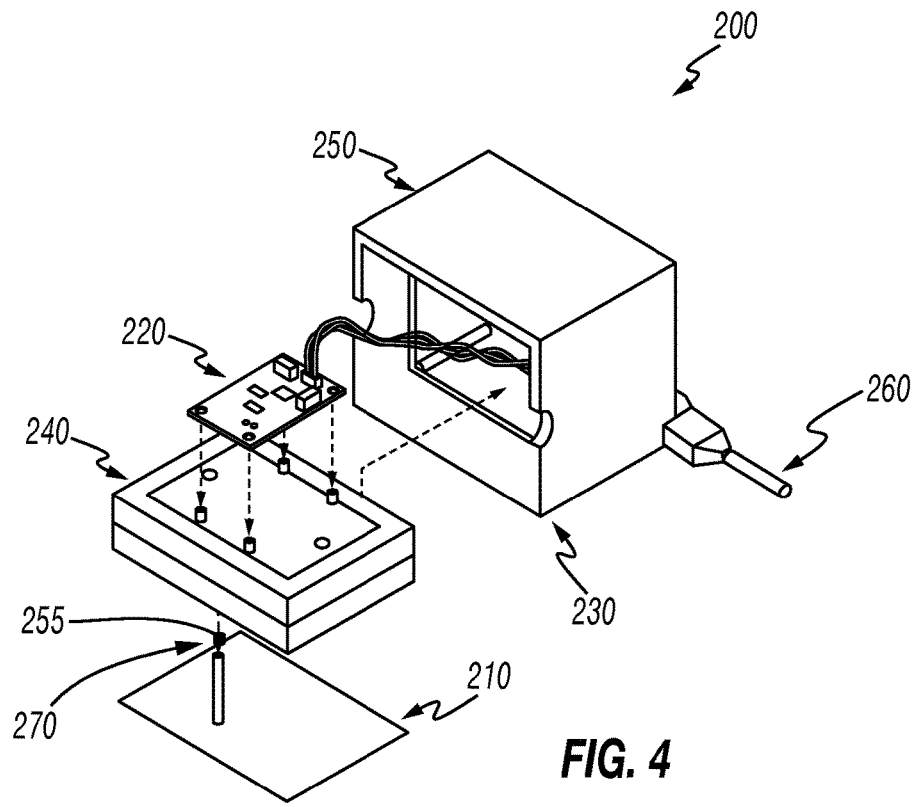
FIG. 4 shows one example embodiment of a capacitance type electrode for detecting an electromagnetic telemetry signal.

FIG. 4 is a cross section schematic of a non-limiting example embodiment of a capacitance type electric potential sensor. Such sensor is described in more detail in U.S. Patent Application Publication No. 2013/0300419 filed by Hibbs. The present example embodiment of a capacitance sensor is provided only to illustrate the principle of methods and apparatus according to the present disclosure and is not intended as a limit on the type or configuration of electric field sensors that may be used in accordance with the present disclosure. The sensor 200 for measuring the electric potential in the earth comprises a sensing plate 210, and an amplifier 220, preferably integrated into a single, non-conducting housing 250, but this is not essential and the amplifier 220 may be housed in a different enclosure than that housing the sensing plate 210. While weather-proof housing both the sensing plate 210 and the amplifier 220 may be desirable, the housing 250 may not be essential in some applications, such as if the sensing plate 210 is buried or if the sensor 200 is only expected to be in place for a short time. The housing should contain an open region (or should be made of a non-conductive material) or the sensing plate should only be partly encased by the housing, to enable the sensing plate to couple to the potential of interest in the earth.

The sensing plate 210 measures an earth potential signal and transmits the earth potential signal to the amplifier 220 via a first connection 255. The distance between the amplifier 220 and sensing plate 210, i.e., the length of the first connection 255, should preferably be minimized to reduce stray capacitance between the first connection 255 and the environment. Preferably the first connection 255 is enclosed in a conductor to minimize signal corruption by environmental interference. Preferably the conductor acts as a guard, wherein its potential is held at or close to the electric potential of the connecting wire by methods known to those skilled in the art. After the signal is amplified and filtered, the signal may pass through an output 260 to a data acquisition system (not depicted in FIG. 4). The signal from the output 260, may, for example, be communicated wirelessly using wireless geophysical sensor communication systems known in the art. See, for example, U.S. Pat. No. 8,238,197 issued to Crice et al. for one non-limiting example of a wireless geophysical data communication system.

The sensing plate 210 may comprise a flat conducting object ranging from 1 square centimeter in area to 100 square centimeters, but is not limited to this size range, does not have to be flat, and does not have to be made of solid material. The sensing plate 210 could take a variety of shapes. The sensing plate 210 may be rigid or can be deformable in order to adapt at least partly to the contours of the earth. For example, within a borehole, the sensing plate 210 could be curved to match the internal diameter of the hole. One or more protrusions or other features may extend from (or form part of) the sensing plate 210 and may be used to mechanically anchor the sensing plate to the earth, if such an anchorage is desired. The protrusions may be of the same material as the sensing plate and are preferably adapted or treated to prevent an electrochemical reaction with the earth. Instead of being solid, the sensing plate 210 may comprise non-solid conducting material, such as a chain mesh. As another alternative, the sensing plate 210 may comprise a thin, flexible metal sheet covering a deformable body, such as a bean bag. The amplifier 220 may include multiple amplification and filtering stages. The sensor 200 produces an output 260 from the amplifier 220, the output 260 being indicative of the earth potential. The output 260 can be calibrated in a suitable test fixture in order to give an accurate measurement.

Locating the amplifier 220 in close proximity to the sensing plate 210 enables an input impedance of the first stage amplifier to be set to a higher value than would be feasible if the sensing plate and amplifier were separated. A particular benefit of a high input impedance is that the signal that is coupled into the amplifier becomes much less dependent on the coupling capacitance and coupling resistance of the sensing plate to the earth, and much less dependent upon the resistance, $R_e$, of the earth between the sensors. The result of this overall reduced dependence on the electrical properties of the earth is that the performance of the sensor becomes relatively immune to weather conditions. For example, for a sufficiently high amplifier input impedance at the upper end of the frequency range of interest, the value of $R_e$ may change by a factor of $10^6$ with essentially no measurable change in the signal potential produced at the sensor output. At lower frequency, the range of earth conductivity that produces negligible effect can be even higher.

To measure an electric field, it is necessary to determine the electric potential at two or more points. For example, two points on, or near, the earth's surface provide a measure of the horizontal electric field, where the electric field, E is given by the difference of the two measured potentials, V1, V2, divided by the linear distance, d, between them; i.e. $E=(V1-V2)/d$. For sites of economic interest, the measurement points may be spaced 20 to 100 m, or farther, apart. For convenience, the individual potentials may be recorded by a separate data acquisition unit, commonly, but not necessarily, located midway between the points, and their difference calculated via a differential amplifier before the data are digitized. The two points may comprise measurements made by two sensors or may comprise measurements made by one sensor at one point, compared to an adequately reliable reference voltage at the other point that could be provided by a conventionally established means, such as a previously installed deep electrical ground stake for a building.

Figure 5:
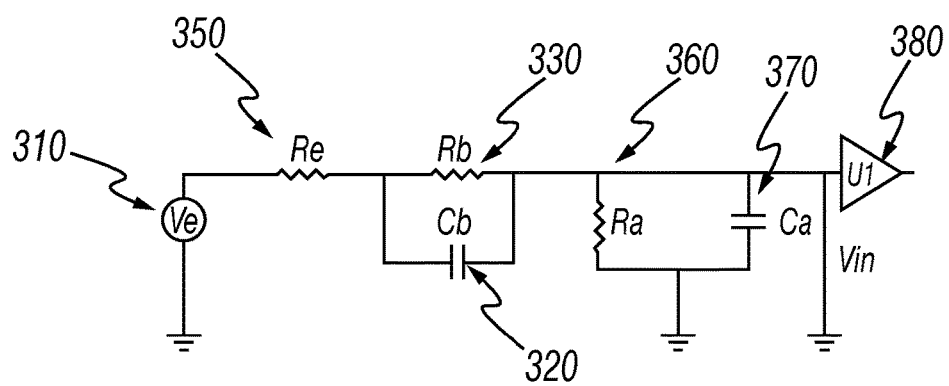
FIG. 5 shows an example equivalent electronic circuit for the electrode shown in FIG. 4.

FIG. 5 is a schematic of an equivalent circuit for a sensor in accordance with one or more embodiments. The potential of the earth is represented by a voltage source, $V_e$, 310. The voltage source comprises the electromagnetic telemetry signal generated by the instruments such as shown in FIG. 3 and noise. The sensing plate 210, couples to the potential $V_e$ 310 via the barrier, a relationship which may be represented by circuit elements: a first capacitor $C_b$, 320, and a first resistor $R_b$, 330, in parallel. The values of $C_b$ and Rb may be determined by the properties of the barrier and the contact capacitance and resistance of the barrier with the earth. The combination of $C_b$ 320 and $R_b$ 330 represents the coupling impedance between the sensing plate 210 and the earth. The bulk resistance of the sensing plate 210 is also included in the value of $R_b$. The "operative capacitive coupling" between the sensing plate 210 and the earth, created by the barrier which provides electrochemical segregation of the sensing plate 210 with respect to the earth, results in and is defined by values of $R_b>10$ kiloohms. and $C_b>2000$ picofarads over the entire operating frequency range of the sensor.

A second resistor $R_e$, 350, represents the bulk resistance of the earth that is present between two points at which the electric potential is to be measured. If one uses two identical sensors 200 located at two points, Re 350 in FIG. 5 may be defined as half the bulk resistance between the measurements at the two points. A third resistor $R_a$, 360, and second capacitor $C_a$, 370, represent the input impedance of the first stage of the amplifier 220, which is depicted in FIG. 5 as U1, 380.

Figure 6:
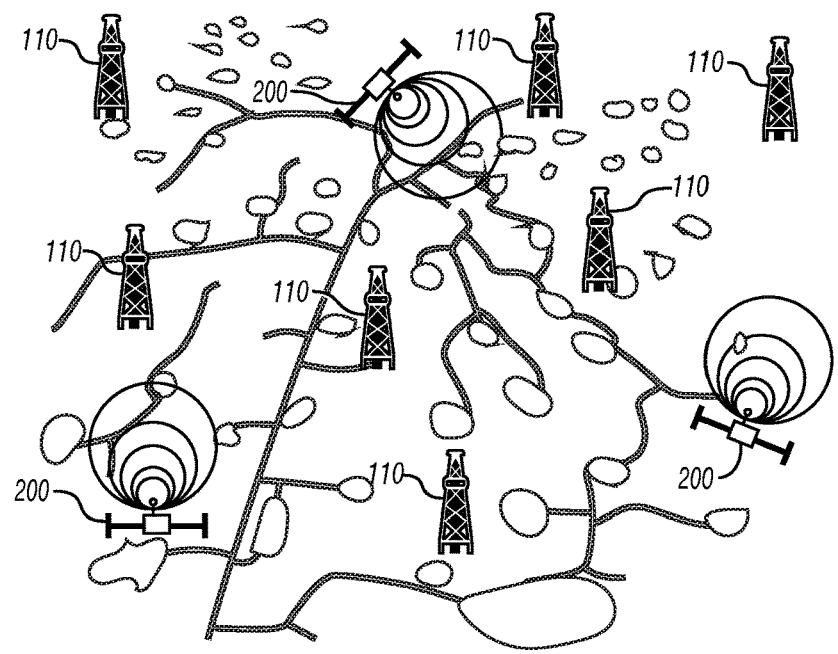
FIG. 6 shows an array of capacitance type electric field sensors disposed in an area wherein a plurality of drilling units are located and may be using electromagnetic telemetry for communication between the surface and instruments in various wellbores.

FIG. 6 shows an example EM sensor network comprising a plurality of sensors 200 such as explained with reference to FIGS. 4 and 5 that may be used in areas where a plurality of drilling units 110 are operating and wherein any one or more of such drilling units 110 may comprise EM telemetry LWD/MWD instrumentation as explained with reference to FIG. 3. Any one or more of the sensors 200 may communicate wirelessly with the control unit (152 in FIG. 3).

Figure 7:
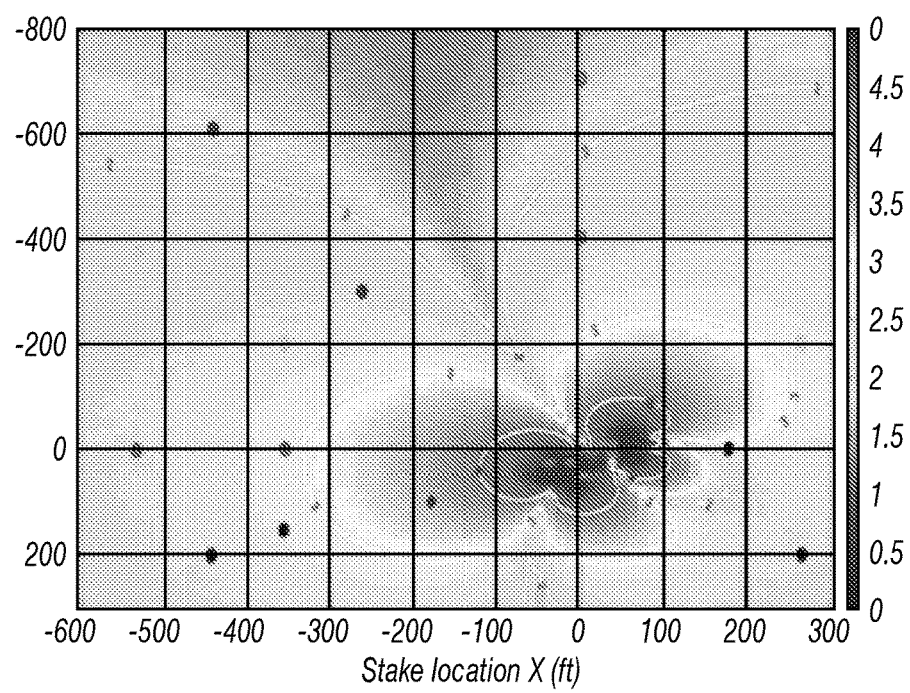
FIG. 7 shows a two dimensional graph of detected noise that may be used in some embodiments to facilitate placement of electrodes for detecting EM telemetry signals.

EM voltage measurements such as made by the sensors illustrated in FIGS. 4 and 5 represent the superposition of EM telemetry signals generated by the EM signal transmitter (120A in FIG. 3) and noise. In some embodiments, placement of the sensors 200 may be made so as to maximize the EM telemetry signal, while minimizing the noise. By performing such optimum placement, it is possible to obtain enhanced signal-to-noise ratio (SNR) for better detection of the EM telemetry signal. From the perspective of the noise, FIG. 7 shows measurements of noise plotted out around the site of the drilling unit (referenced to the position of the blowout preventer—BOP). The dots are the electrode locations, which may be referred to as remote stakes. The remote stakes may be used to map the noise distribution around the BOP. The noise potential values are contoured ranging from high noise to small noise level. It may be observed in FIG.

7 that there exists an area wherein noise is much smaller than in the rest of the area surrounding the drilling unit or BOP. This means that if EM sensors are placed in such area, one may expect much smaller noise amplitudes.

The point here is that mapping noise distribution may require a large number of electrodes deployed around the rig site in order to obtain the noise distribution (contour) for identifying for the lowest noise zone and optimize the sensor placement. In this regard, capacitive electrodes and related acquisition systems simplify the setup and enable much easier placement of the sensors in locations having relatively low noise.

Figure 8:
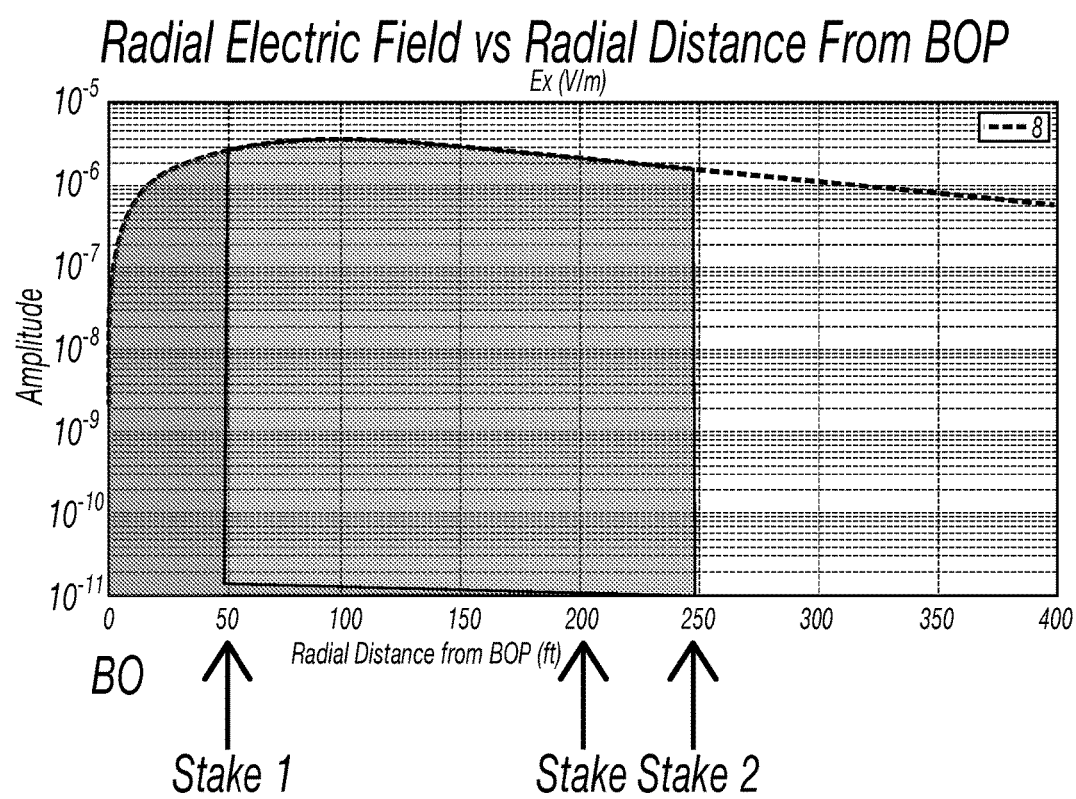
FIG. 8 shows a graph of the detected EM telemetry signal strength with reference to distance from a blowout preventer or well head.

Referring to FIG. 8, it was previously believed that maximal EM telemetry signal could only be obtained by placing one electrode or sensor at the well head e.g., at the (BOP), and the other electrode or sensor at a location hundreds of feet away. FIG. 8 shows that such sensor or electrode placement may not in fact be required. FIG. 8 shows an electric field amplitude, e.g., the EM telemetry signal amplitude, with respect to radial distance from the BOP. It may be observed in FIG. 8 that at the BOP, the electric field amplitude is close to zero. The electric field amplitude may gradually increase as distance from the BOP increases, reaching a maximum at a certain distance, and then gradually decreases with increasing radial distance from the BOP. It is known that the voltage between two electrode or sensor positions is the integral of the electric field over the distance, i.e., the area enclosed by the curve. The numerical calculation used to generate the graph in FIG. 8 has shown that the area from BOP to the stake (separation 200 feet) is actually a little less than the area from Stake 1 to Stake 2, which are shifted 50 feet away from the BOP and the stake, respectively. This has demonstrated that it is not necessary to always connect a sensor or electrode with the BOP. The foregoing principle may be applied with equal effect when using capacitance electrodes according to the present disclosure. For example, in some embodiments, capacitive electrodes may be positioned downhole and the telemetry signal detected between the downhole capacitive electrode and a second electrode (e.g., galvanic or capacitive) at the surface. Further, a capacitive electrode array may be deployed and may also operate within a network or electrodes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for signal communication between a well drilling instrument and the Earth's surface, comprising:
    generating an electromagnetic field in an instrument disposed in drill string used to drill a wellbore, the electromagnetic field comprising encoded measurements from at least one sensor associated with the instrument;
    measuring a signal corresponding to one or more of an amplitude, phase, or frequency of the electromagnetic field; and
    decoding the measurements from the measured signal, wherein the measured signal comprises at least one of:
        a voltage imparted across a capacitive electrode proximate a ground surface and a galvanic electrode in contact with the ground surface, or
        a voltage imparted across two capacitive electrodes each proximate the ground surface and separated from each other by a known distance.

2. The method of claim 1 wherein the generating an electromagnetic field comprises imparting a time varying voltage across in insulating gap between electrically conductive components of the instrument.

3. The method of claim 1 wherein the generating an electromagnetic field comprises imparting a time varying electric current through a toroidal coil forming part of the instrument.

4. The method of claim 1 further comprising wirelessly communicating the measured voltage from a communication device proximate the electrodes to a location spaced apart from the communication device.

5. The method of claim 1 further comprising measuring noise voltage at a plurality of locations with reference to a surface location of the wellbore, the noise measurements comprising at least one of a voltage imparted across a capacitive electrode proximate the ground surface and a galvanic electrode in contact with the ground surface, or a voltage imparted across two capacitive electrodes each proximate the ground surface and separated from each other by a known distance, and selecting at least one position for making measurements of the signal based on the measurements of noise voltage.

6. A system for communication between a wellbore instrument and the Earth's surface, comprising:
    an electromagnetic field generator associated with the wellbore instrument, the electromagnetic field generator configured to encode measurements made by at least one sensor associated with the wellbore instrument; and
    an electromagnetic field detector in signal communication with the Earth's surface, the electromagnetic field detector comprising at least one of:
        a voltage measuring circuit coupled across a capacitive electrode proximate a ground surface and a galvanic electrode in contact with the ground surface, or
        a voltage measuring circuit coupled across two capacitive electrodes each proximate the ground surface and separated from each other by a known distance.

7. The system of claim 6 wherein the electromagnetic field generator associated with the wellbore instrument comprises an insulating gap disposed between electrically conductive parts of the wellbore instrument.

8. The system of claim 6 wherein the electromagnetic field generator associated with the wellbore instrument comprises a toroidal coil disposed on the wellbore instrument.

9. The system of claim 6, wherein the wellbore instrument is coupled to a drill string and further comprising at least one standoff or centralizer comprising an electrically insulating material coupled to the drill string.

10. The system of claim 6, wherein the wellbore instrument is coupled to a drill string and further comprising at least one standoff or centralizer comprising an electrically conductive material coupled to the drill string.

11. The system of claim 6 further comprising a wireless transceiver in signal communication with and proximate to the voltage measuring circuit.

12. A method for measurement in a wellbore, comprising:
    moving a wellbore instrument coupled to a drill string along an interior of the wellbore, the wellbore instrument including at least one sensor;

generating an electromagnetic field in the wellbore instrument, the electromagnetic field comprising encoded measurements from the at least one sensor;

measuring a signal corresponding to one or more of an amplitude, phase, or frequency of the electromagnetic field; and decoding the measurements from the measured signal, wherein the measured signal comprises at least one of:

a voltage imparted across a capacitive electrode proximate a ground surface and a galvanic electrode in contact with the ground surface, or a voltage imparted across two capacitive electrodes each proximate a ground surface and separated from each other by a known distance.

13. The method of claim 12 wherein the generating an electromagnetic field comprises imparting a time varying voltage across in insulating gap between electrically conductive components of the instrument.

14. The method of claim 12 wherein the generating an electromagnetic field comprises imparting a time varying electric current through a toroidal coil forming part of the instrument.

15. The method of claim 12 further comprising wirelessly communicating the measured voltage from a communication device proximate the electrodes to a location spaced apart from the communication device.

16. The method of claim 12 further comprising measuring noise voltage at a plurality of locations with reference to a surface location of the wellbore, the noise measurements comprising at least one of a voltage imparted across a capacitive electrode proximate the ground surface and a galvanic electrode in contact with the ground surface, or a voltage imparted across two capacitive electrodes each proximate the ground surface and separated from each other by a known distance, and selecting at least one position for making measurements of the signal based on the measurements of noise voltage.

* * * * *